Patented Oct. 7, 1947

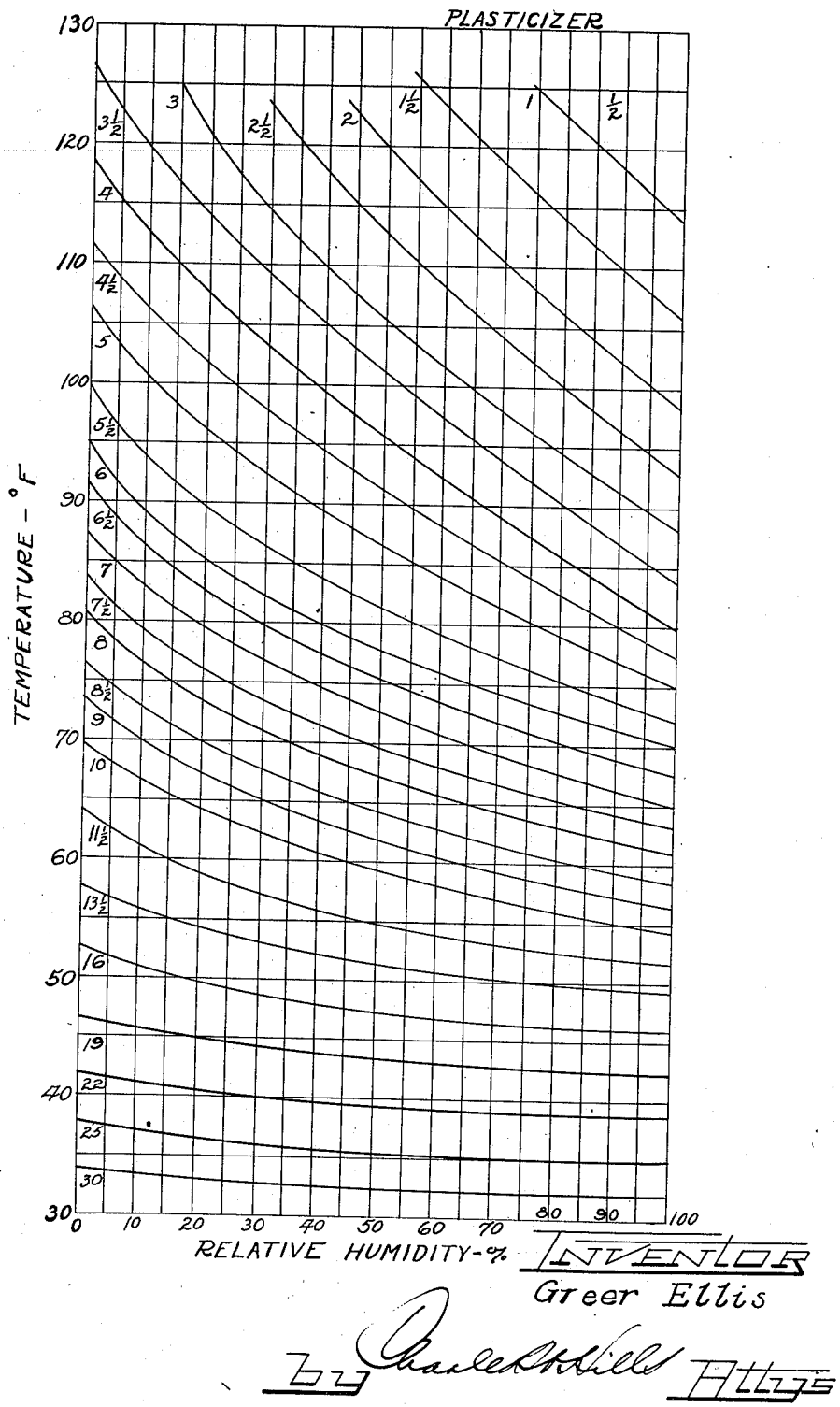

2,428,559

UNITED STATES PATENT OFFICE 2,428,559

RESINOUS COMPOSITION FOR DETERMINING THE STRAIN CONCENTRATION IN RIGID ARTICLES

Greer Ellis, Chicago, Ill., assignor to Magnaflux Corporation, Chicago, Ill., a corporation of Delaware Application July 28, 1944, Serial No. 547,027

7 Claims. (Cl. 106—240)

1

This invention relates to a film forming composition for use in the "Method of determining strain concentration in rigid articles," disclosed in my application for patent, Serial No. 239,338, filed November 7, 1938 (issued September 8, 1942, as United States Patent No. 2,294,897). The invention disclosed in said filed application pertains to a method of determining the strain concentration in rigid articles including coating a rigid article with a continuous adherent uniformly brittle film and subjecting the coated article to increasing known loads initially incapable of cracking the film coating the article areas to be tested. On such progressively increased loading the coating film will crack (normally to the strain direction) initially over the most highly strained area of the coated rigid article and subsequently over areas of lower strain concentration, as the load is increased. The loading is continued until the same characteristic crack pattern has occurred in all the areas to be tested. The relative strain concentration in the article at said areas may then be computed, being inversely proportional to the known loads applied to the article and effective to form said crack patterns over the tested areas.

The present application also discloses improvements over my co-pending application entitled "Film forming composition and method of applying the same," Serial No. 351,221 (issued July 27, 1943, as United States Patent No. 2,325,116), filed August 3, 1940.

This application is a continuation-in-part of my application Serial No. 427,688, filed January 22, 1942, and entitled "Means for determining strain concentration in rigid articles," which is a continuation-in-part of my application entitled "Film forming composition," Serial No. 277,448, filed June 5, 1939, which in turn is a continuation-in-part of my said application Serial No. 239,338.

The exact manner of determining the local strain concentration in rigid articles by methods including coating said rigid articles with uniformly brittle film is disclosed in my application Serial No. 239,338, referred to hereinabove, and in my application Serial 359,607, filed October 3, 1940, and entitled "Method of determining the magnitude of strains in rigid articles" (issued February 9, 1943, as United States Patent No. 2,312,845). For the purposes of the present application, it suffices to state that the testing methods of the above-identified applications require a continuous adherent film having uniform brittleness in spite of inevitable local variations in thickness due to the fact that no film forming composition can, in actual practice, be applied to the article to be tested as a layer of uniform thickness, whether sprayed, brushed, or dipped in particular, where the article to be tested is contoured irregularly.

Besides being uniformly brittle despite local variations in thickness, films to be used for strain concentration measurements should preferably have sufficient internal tensile stress to keep open any cracks once formed therein, even after release of the strain causing the crack formation. However, cracks that have closed after release of the cracking strain may be brought out and made clearly evident by etching, as disclosed hereinbelow. The films should also have a minimum of plasticity, to reduce plastic film flow on prolonged static loading of a rigid article being tested.

I have found that film forming compositions yielding films that are uniformly brittle in spite of local variations in thickness and that are distinguished by a suitable internal stress condition as well as by a minimum of plasticity may be prepared by properly plasticizing solutions of brittle resins in solvents that evaporate quickly and completely after the film forming compositions have been applied to the rigid articles to be tested. Unplasticized brittle resin films tend to "craze" or crack spontaneously and are, therefore, unsuitable for measuring purposes. Incorporation with brittle resin films of plasticizers in the amounts conventionally added to paints, varnishes, lacquers and like film forming compositions used for protective or decorative purposes yields films that do not crack under the stress concentrations effected when testing as described in my co-pending application, and such conventionally plasticized resin films are also useless for testing purposes. However, brittle resin films plasticized sufficiently to prevent crazing under testing conditions, but not enough to remove all internal strains, are well adapted for use in my methods of determining strain concentration in rigid articles by means of brittle films.

I have further discovered that the amounts of plasticizer to be incorporated with a given brittle resin must be varied in accordance with the temperature and humidity conditions prevailing when testing, for, as I have found, brittle resins are quite sensitive to variations in temperature and humidity. Lowering the temperature by as little as 5° C. may, in some instances induce crazing of a brittle resin film otherwise suitably plasticized for testing purposes.

It is, therefore, an important object of the present invention to provide film forming compositions plasticized to an extent such as to yield brittle films suitable for use in determining strain concentrations in rigid articles.

Another object of this invention is to provide series of film forming compositions plasticized to various extents from which one suitable composition may be selected for use in the determination of strain concentration in a rigid article under the particular temperature and humidity conditions which happen to prevail at the time of testing.

Other and further objects and features of the present invention will become apparent from the following description and appended claims as illustrated by the accompanying drawing.

As indicated hereinabove, the film forming compositions, according to this invention, include a resin, a solvent and a plasticizer. The resin used should be brittle, and may be of natural or synthetic origin. Thus, certain thermosetting phenol-formaldehyde condensation products have been found suitable. Among the natural resins may be mentioned gum rosin, wood rosin, dammar, and various copals such as manila, kauri, Congo, and the like. Hardening of the natural resins may be effected either by fusion or in the presence of water or solvents, by treatment of the resin with basic oxides or hydroxides, such as calcium, magnesium, and/or zinc oxides, in the presence of a catalyst such as acetic acid or an acetate; by oxidation with a current of hot air, and in other ways known to the art relating to natural resins. The hardened resin may thus comprise a metallic resinate or oxidation product of the natural resin or both. Various types of lime—and zinc oxide—hardened resins, produced by reacting gum or wood rosin with lime and/or zinc oxide, in the presence of a catalyst, to form a limed rosin, zinc resinate, or zinc-calcium resinate, have been found particularly useful. The zinc—and zinc-calcium resinates described in Patents Nos. 2,346,992-5 have been found satisfactory for my purposes. I can also prepare a suitable hard resin by reacting rosin with about 15% by weight of calcium acetate. Such hardened resins are available commercially as uniform commodities at low cost.

The plasticizer used should have a very low evaporation rate, to insure that the film, once formed, will retain its physical properties unchanged for considerable periods of time. The plasticizer should also be compatible with the resin and solvent used, both in the film forming composition and in the film. Numerous substances of the types commonly used as plasticizers have been suitable for use as plasticizers for the purposes of the present invention. Dibutyl phthalate and normal butyl stearate may be mentioned in particular.

The solvents used should be capable of dissolving the resin and the plasticizer at all stages in the formation of the film. The solvents should not have a tendency to absorb moisture from the air, and should evaporate rapidly and completely after the film forming composition has been applied to the article to be tested. No appreciable parts or fractions of the solvent should be retained in the dried film. For the purposes of this invention low boiling solvents are desirable in order to effect rapid evaporation and drying. A single pure compound forms the best solvent, since a mixture of compounds will not always evaporate uniformly or completely, the highest boiling constituents tending to evaporate slowly or to remain in the film. This is especially noticeable in the case of mixtures obtained from natural sources. Among the low boiling liquid carbon compounds found particularly suitable for the purposes of the present invention may be mentioned carbon disulfide, methylene dichloride and 1,2 (cis) dichlorethylene.

The tendency to crack formation in the uniformly brittle films formed by compositions including the resins, solvents and plasticizers disclosed depends on the internal stress conditions of the films and on their tendency to plastic flow. For stress determining purposes, the sensitivity (i. e., the lowest strain value at which crack patterns are formed) should preferably be approximately 0.00075 inch per inch. A more highly sensitive film is more likely to craze during drying, the too severe internal stresses generated on drying being made apparent by spontaneous cracking forming irregular patterns. Less sensitive films tend to creep more under the influence of strains and the patterns formed during loading are more apt to close upon release of the loads.

Expressed in terms of sensitivity, films with a sensitivity below 0.0005 are very apt to be badly crazed if dried at testing temperature. A film having a sensitivity as low as 0.0003 will not craze, if the film forming material is dried at a temperature 5° higher than the testing temperature indicated hereinbelow for a film forming composition having the same plasticizer content, even if tested at a temperature 5° below said indicated temperature. Drying under excessively high humidity conditions will accomplish the same purpose. Coatings with a sensitivity above 0.0010 will have a strong tendency to close the cracks upon release of the load, but are operative up to a strain sensitivity of 0.0030, since the cracks may be observed while under load or else the closed cracks after release of load can be made visible by treatment with an etchant liquid in a manner described hereinbelow.

For average conditions, a sensitivity of from 0.0006 to 0.0009 is preferred. If the sensitivity is below 0.0006, and the film has not been dried above testing temperature, there will likely be formed on loading some irregular craze marks in addition to the regular strain crack pattern, which two types of cracks must then be carefully distinguished. When the sensitivity is between 0.0009 and 0.00105, it is usually possible to cause the cracks to remain, if intermittent loading is practiced, by holding each incremental load on the structure for several minutes before releasing the load. Some internal stress must prevail in all operative films. At neutral internal stress, a film will crack at a strain of about 0.0035, a value higher than the upper limits of 0.0010, 0.00105 (when the load is held before release) and 0.0030 stated hereinabove. Conventionally plasticized films, of course, are plasticized to an extent where all internal strain is removed, for conventional plasticizing is done to render the films as durable and as resistant to strains as possible.

As disclosed hereinabove, the brittle films of this invention are sensitive to changes in temperature and in humidity. Testing temperatures below the temperature at which the film was formed build up internal stresses in the films which cause the films to crack at smaller external stress values. An approximate value of the internal stress caused by temperature changes in a brittle film deposited on steel can be computed from the coefficients of expansion of steel and of rosin which are, respectively, 0.000012 and 0.00012 per degree centigrade. Thus, in the case of a rosin film on steel, for each degree centigrade above or below the temperature of film formation, a strain will develop of approximately 0.00011. This fact explains why brittle films will craze spontaneously if the temperature is lowered suddenly by, say 5° C. Such spontaneous cracking takes the form of an irregular pattern of lines characteristically different from the regular line pattern effected by external stressing. Obviously it is possible to make the brittle films operative for testing purposes at smaller loads by suitably lowering the testing temperature. Conversely, raising the testing temperature will desensitize the brittle films to smaller loads.

It may be noted that the formation of cracks in films according to this invention, once initiated, proceeds under the influence of increased loads to a point where the cracks are spaced from each other by approximately five times the thickness of the film. Increasing the load still further will not cause any significant formation of additional cracks until the strain is approximately doubled. The initial cracking will occur, if incremental loading is commenced with loads initially incapable of effecting crack formation, with irregular distribution of cracks of irregular length over areas of uniform strain concentration. As the load is increased, more cracks form until the areas of uniform strain concentration are filled in with regularly distributed cracks of regular length, when the above-mentioned cessation of further crack formation occurs. The length of this crack forming cycle is, of course, influenced by the extent to which the brittle film has been plasticized. A limited extent of plasticizing favors a long crack forming cycle, while in a relatively more freely plasticized film, initiation of crack formation is delayed.

The above explanations indicate clearly why any one film forming composition according to the present invention is operative only within a relatively limited range of temperature and humidity conditions. The appended drawing shows, on a chart where relative humidity is plotted against temperature in degrees Fahrenheit, the operative ranges of film forming compositions including from 150 to 300 parts by weight of carbon disulfide and 100 parts by weight of a resin-like product having a melting point between 125° and 185° C. (capillary tube) and comprising the reaction product of rosin and at least 6% of zinc oxide. The area between each pair of adjacent curves indicates the temperature-humidity conditions within which such a zinc-resinate solution in carbon disulfide plasticized to a definite extent will have a sensitivity of between 0.0007 and 0.0008 inch per inch, i. e., where such a strain is barely sufficient to initiate cracking. More particularly, the area above the topmost curve is that wherein a composition including from 150 to 300 parts, by weight, of carbon disulfide, 100 parts of the zinc-resinate, and ½ part of dibutyl phthalate, will have a sensitivity of 0.0007 to 0.0008. The area between the topmost curve and the next curve defines those temperature-humidity conditions wherein a similar composition containing 1 part of dibutyl phthalate will have a sensitivity of from 0.0007 to 0.0008. Further down, the areas between the curves indicate, respectively, the corresponding temperature-humidity combinations for like compositions including, respectively, 1½, 2, 2½, 3, 3½, 4, 4½, 5, 5½, 6, 6½, 7, 7½, 8, 8½, 9, 10, 11½, 13½, 16, 19, 22, 25 and 30 parts by weight of dibutyl phthalate.

Any given composition having a plasticizer content indicated on the chart, if used under the temperature-humidity conditions indicated in the chart for the composition having the next higher plasticizer content, will have a sensitivity on the order of between 0.0006 to 0.0007 but is then more likely to craze if the temperature or the humidity should happen to drop while the film forming composition is drying. If used under temperature-humidity conditions indicated for the composition having the second next higher plasticizer content, the film formed by the composition is almost certain to craze during drying at testing temperature. Moving in the other direction, use of a composition having a given plasticizer content under temperature-humidity conditions indicated for the composition having the next lower plasticizer content gives the film a sensitivity of from 0.0008 to 0.00009, with a possibility that the crack patterns formed on loading may disappear upon release of the load. Use under the temperature-humidity conditions indicated for the composition having the second next lower plasticizer content lessens the sensitivity still more and increases the certainty that the crack patterns will close upon release of the load.

In brief, the chart serves to indicate, for the specific compositions described, the conditions of temperature and humidity which form the optimum compromise between sensitivity and lessened tendency to crazing during drying while assuring that crack patterns once formed will not close after the crack forming load has been released. The chart also provides an instrument for selecting appropriate compositions which will initiate strain crack formation at definite values between the practical limits of .0003 and .0030.

The film-forming compositions whose operative temperature-humidity ranges are indicated in the chart may, therefore, be generally described as including from 150 to 300 parts by weight of carbon disulfide, 100 parts by weight of a reaction product of rosin with at least 6% of zinc oxide having a melting point of from 125° to 185° C. (capillary tube), and from ½ to 30 parts by weight of dibutyl phthalate, the exact amount of dibutyl phthalate being dependent on which temperature-humidity combination included in the chart happens to prevail during testing conditions. It should be clearly understood, however, that the compositions in question may be adapted for use under other temperature-humidity conditions than those included in the chart by proper variation in the plasticizer content. The limits for plasticizer content of from ½ to 30 parts by weight are, therefore, applicable only to testing temperatures ranging from 30° to 125° F., those being the upper and lower temperature limits of the chart, which, however, covers humidities ranging from 0 to 100%. At higher and lower temperatures, respectively, less than ½ part and more than 30 parts of dibutyl phthalate may be required.

A similar series of compositions operative under like humidity conditions and at a temperature ranging from 55° to 95° F. may include 100 parts by weight of 6% limed wood rosin, from 150 to 300 parts by weight of carbon disulfide and from 2 to 10 parts by weight of dibutyl phthalate, the exact amount of dibutyl phthalate being determined by the temperature-humidity conditions prevailing during testing.

Still another series of compositions may include 100 parts by weight of 15% calcium acetate treated wood rosin, from 150 to 300 parts by weight of carbon disulfide and from 4 to 20 parts by weight of dibutyl phthalate.

A further series of compositions may include 50 parts by weight of the reaction product of zinc oxide with rosin described hereinabove, 50 parts by weight of "6451 Durez" resin (a thermosetting phenolic type of synthetic resin having a melting point of from 115° to 120° C.), from 150 to 300 parts by weight of carbon disulfide, and from 3 to 15 parts by weight of dibutyl phthalate.

In the four above disclosed series of compositions methylene dichloride may be substituted, part for part, for the carbon disulfide, from 3 to 20 parts by weight of normal butyl stearate then being used in place of the dibutyl phthalate for temperatures ranging from 55° to 95° F., and from 1 to 60 parts normal butyl stearate being used for temperatures ranging from 30° to 125° F. Or equal weights of the low boiling isomer of ethylene dichloride may be substituted for the carbon disulfide, from 2 to 12 parts by weight of normal butyl stearate then being substituted for the dibutyl phthalate for temperatures of from 55° to 95° F. and from ½ to 40 parts in temperatures of from 30° to 125° F.

Roughly speaking, the ranges of plasticizer contents specified for the composition series disclosed will provide for relative humidity conditions ranging from 0 to 100% and for temperatures varying from 30° to 130° F.

The amount of solvent used may be varied according to the mode of application of the film forming compositions. In the series of compositions described, 150 to 200 parts by weight of solvent on the basis of 100 parts by weight of the resin is a suitable solvent amount when the composition is to be applied by dipping or brushing. 200 to 250 parts by weight of solvent is used in most instances where application is by spraying. 250 to 300 parts by weight of solvent is used for a finish coat in the spraying of complicated structures which have "dusted" badly during previous spraying operations.

In the case of the above disclosed series of compositions, the solvents are quite volatile and the amounts of solvents have been so limited that on being sprayed the compositions form films clouded with enormous numbers of minute air bubbles. This clouding is thought to be due to the viscosity or dryness of the solution being such that the bubbles are entrapped before having had a chance to move to the surface of the deposited film and break. To promote such bubble formation, the compositions should be sprayed with the greatest amount of air possible. The bubble clouded films thus obtained have been found to be more accurate for testing purposes.

The uniform brittleness in spite of local variations in thickness is limited to films 0.003 to 0.008 inch thick. Application of the film forming compositions should be carried out accordingly.

If desired, film forming compositions comprising a resin, a plasticizer, and a solvent can be pigmented to yield pigmented films. Such pigmented films are of special interest where the surface of the article to be tested is either dull or else presents surface markings, since in the first case cracks in a transparent film would not be visible due to absorption of light transmitted through the film by the dull surface, while in the second case cracks in a transparent film would be difficult to recognize. The pigmented film is also operative over some painted or dirty surfaces. Such pigmented film forming composition should contain slightly larger percentages of plasticizer than non-pigmented compositions to compensate for the pigment added.

Instead of pigmenting the film forming composition, it is alternatively possible to interpose a light reflecting film between the surface of the article to be tested and the transparent brittle film. All films which per se reflect light do not necessarily do so after being covered with a transparent film. Light is reflected from the interface between the two films only if there is a sufficient difference in refractive index between the two films or if the lower film contains a light-reflecting pigment. Since most materials which could practically be considered as undercoats have indices of refraction not greatly different from resins, the most suitable method of formulating a light-reflecting undercoat involves pigmenting the latter with a light-reflecting pigment such as aluminum powder. Obviously the undercoat should not affect or be affected by the deposition of a brittle film thereon. For this reason, a solution of nitrocellulose in ethyl acetate containing a bright aluminum powder in suspension has been used. Ethyl acetate evaporates quickly and will consequently not be retained in the undercoat to affect the resinous films; and the non-polar, low-boiling compounds of carbon used in the composition forming the transparent brittle film do not affect the nitro-cellulose film.

Cracks in the pigmented resinous film, as well as in plain or transparent films, can be made visible by etching and staining with a suspension or solution of a differently colored pigment or dye in some suitable solvent, for instance, ligroin. Such staining will bring out and make evident cracks formed during testing and closed upon release of the cracking strain, as may occur when the strain sensitivity of the film is from 0.0010 to 0.0030. For such etching, a stain solution comprising ligroin and a soluble dye is preferably applied to the film after testing, stain being removed from other than cracked localities by washing with, for instance, clear ligroin or a soap solution or other aqueous solutions of emulsifying agents.

The film forming compositions of this invention have been successfully used on many types of surfaces and materials, from glass to rough welds and heavy castings. All loose scale and any surface coating which is affected by the above-mentioned solvents and all grease or oil should be removed before the film forming compositions are applied. Cleaning with a rotating wire brush, or by fine sand blasting, finished by cleaning with carbon disulfide, methylene dichloride, ethylene dichloride or any clean lacquer solvent is quite satisfactory. Although not absolutely necessary, smoothing the surface of small critical areas, such as fillets, will increase the visibility of initial strain patterns there and give more accurate results. Lint should not be left on the surface, for the strain-indicating coating will build up on any such small particles.

An aluminum pigmented undercoating has proved useful on all types of surfaces, regardless of whether dull or polished, when transparent films are used, as is usually done. Such an undercoating provides a uniform background over the whole article being tested, facilitating judgment of the thickness of the strain-indicating coating during spraying and providing a uniformly brilliant surface against which the strain patterns are clearly visible as formed during testing. Further, scratches and disfigurations which otherwise might show up confusingly similar to a strain pattern are minimized. The undercoating lacquer should be allowed to dry for at least fifteen minutes before the strain-indicating composition is applied.

The strain-indicating coating to be used in each particular instance is selected according to the temperature and humidity conditions prevailing where drying and testing will be carried out. These conditions can easily be determined by means of a thermometer and a psychrometer. If possible constant temperature and humidity conditions should be maintained during spraying or other form of application, drying and testing. In any case, temperature variation during drying and testing should not exceed ±10° F. and during testing preferably should not amount to more than ±1° F. Humidity does not tend to vary as much as temperature, and usually offers no problems. The time of drying should be at least six hours, and preferably from twelve to twenty-four hours. Less than six hours drying suffices only if the thickness of the film is close to 0.003 inch.

The above disclosed preferred embodiments of the present invention serve merely as illustrative examples of the working of the invention. Details of composition may be varied within a wide range without departing from the principles of this invention which relate broadly to solutions of a brittle resin dissolved in a solvent capable of evaporating quickly and substantially completely and adapted for measurement of strain concentration in rigid articles by being plasticized barely to such an extent as to prevent crazing under the specific atmospheric temperature and humidity conditions prevailing on drying and on strain determination. It is therefore not my purpose to limit the patent granted on this invention otherwise than necessitated by the scope of the appended claims.

I claim as my invention:

1. A liquid composition capable of drying by evaporation to form a uniformly brittle film responsive to strains by cracking and adapted for use in measuring the surface strain concentration in a rigid article at some temperature within the range of from 30° to 125° F., the exact temperature within said range being dependent upon the relative humidity of the atmosphere about said film, said composition consisting essentially of 100 parts by weight of the reaction product of rosin with at least 6% zinc oxide and having a melting point of 125° to 185° C. (capillary tube), 150 to 300 parts by weight of carbon disulfide, and from ½ to 30 parts by weight of dibutyl phthalate, the exact amount of dibutyl phthalate being that conferring on the resulting film a strain sensitivity of from 0.0003 to 0.0030 inch per inch at said temperature and said relative humidity whereby strain concentration determinations can be carried out at said temperature and said relative humidity at which said film is in said numerically defined status of strain sensitivity.

2. A liquid composition capable of drying by evaporation to form a uniformly brittle film responsive to strains by cracking and adapted for use in measuring the surface strain concentration in a rigid article at some temperature within the range of from 30° to 125° F., the exact temperature within said range being dependent upon the relative humidity of the atmosphere about said film, said composition consisting essentially of 100 parts by weight of 6% limed rosin, 150 to 300 parts by weight of methylene dichloride, and 1 to 60 parts by weight of normal butyl stearate, the exact amount of normal butyl stearate being that conferring on the resulting film a strain sensitivity of from 0.0003 to 0.0030 inch per inch at said temperature and said relative humidity whereby strain concentration determinations can be carried out at said temperature and said relative humidity at which said film is in said numerically defined status of strain sensitivity.

3. A liquid composition capable of drying by evaporation to form a uniformly brittle film responsive to strains by cracking and adapted for use in measuring the surface strain concentration in a rigid article in some temperature within the range of from 30° to 125° F., the exact temperature within said range being dependent upon the relative humidity of the atmosphere about the film, said composition consisting essentially of 100 parts by weight of 15% calcium acetate treated rosin, 150 to 300 parts by weight of 1, 2 (cis) dichlorethylene, and ½ to 40 parts by weight of normal butyl stearate, the exact amount of normal butyl stearate being that conferring on the resulting film a strain sensitivity of from 0.0003 to 0.0030 inch per inch at said temperature and said relative humidity whereby strain concentration determinations can be carried out at said temperature and said relative humidity at which said film is in said numerically defined status of strain sensitivity.

4. A liquid coating composition for determining the strain concentration in a rigid article and capable of drying by evaporation to form a uniformly brittle film responsive to strains by cracking, consisting essentially of a solution of a metal resinate, the metal resinate of said solution when unplasticized being capable of forming a film tending to craze, the solvent of said solution being non-hygroscopic and capable of evaporating completely when said solution is applied to a rigid article so as to leave a resin film that if unplasticized would tend to craze, said solution being plasticized with from ½ to 60 parts of compatible plasticizer per 100 parts of resinate so that the film produced by complete evaporation of said solvent will have a strain sensitivity of from 0.0003 to 0.0030 inch per inch at some temperature within the range of from 30° to 125° F., the exact temperature within said range being dependent upon the relative humidity of the atmosphere about said film, whereby strain concentration determinations can be carried out at said temperature and at said relative humidity at which said film is in said numerically defined status of strain sensitivity.

5. A liquid coating composition for determining the strain concentration in a rigid article and capable of drying by evaporation to form a uniformly brittle film responsive to strains by cracking, said composition consisting essentially of a solution in carbon disulfide of a reaction product of rosin with at least 6% zinc oxide and having a melting point of from 125° to 185° C. capillary tube), said composition being plasticized with from ½ to 30 parts of dibutyl phthalate per 100 parts of said reaction product of rosin so that the film produced by complete evaporation of said carbon disulfide will have a strain sensitivity of from 0.0003 to 0.0030 inch per inch at some temperature within the range of from 30° to 125° F., the exact temperature within said range being dependent upon the relative humidity of the atmosphere about said film, whereby strain concentration determinations can be carried out at said temperature and at said relative humidity at which said film is in said numerically defined status of strain sensitivity.

6. A liquid coating composition for determining the strain concentration in a rigid article and capable of drying by evaporation to form a uniformly brittle film responsive to strains by cracking, said composition consisting essentially of a solution in methylene dichloride of a limed rosin, said composition being plasticized with from ½ to 30 parts of normal butyl stearate per 100 parts of said limed rosin so that the film produced by complete evaporation of said methylene dichloride will have a strain sensitivity of from 0.0003 to 0.0030 inch per inch at some temperature within the range of from 30° to 125° F., the exact temperature within said range being dependent upon the relative humidity of the atmosphere about said film, whereby strain concentration determinations can be carried out at said temperature and at said relative humidity at which said film is in said numerically defined status of strain sensitivity.

7. A liquid coating composition for determining the strain concentration in a rigid article and capable of drying by evaporation to form a uniformly brittle film responsive to strains by cracking, said composition consisting essentially of a solution in 1, 2 (cis) dichlorethylene of a calcium resinate, said composition being plasticized with from ½ to 30 parts of normal butyl stearate per 100 parts of said calcium carbonate so that the film produced by complete evaporation of said 1, 2 (cis) dichlorethylene will have a strain sensitivity of from 0.0003 to 0.0030 inch per inch at some temperature within the range of from 30° to 125° F., the exact temperature within said range being dependent upon the relative humidity of the atmosphere about said film, whereby strain concentration determinations can be carried out at said temperature and at said relative humidity at which said film is in said numerically defined status of strain sensitivity.

GREER ELLIS.

REFERENCES CITED

The following references are of record in the file of this patent:

UNITED STATES PATENTS

| Number    | Name    | Date          |
|-----------|---------|---------------|
| 1,947,334 | Clegg   | Feb. 20, 1934 |
| 1,856,371 | Baldwin | May 3, 1932   |
| 1,813,735 | Gabriel | July 7, 1931  |
| 1,856,371 | Baldwin | May 3, 1932   |